Figure 4:
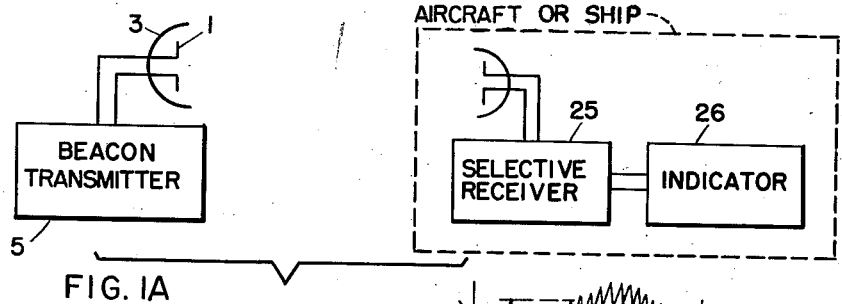
Figure 4:
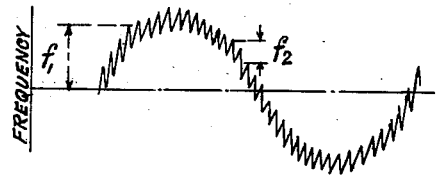

July 29, 1952  S. N. VAN VOORHIS ET AL  2,605,394

HIGH-FREQUENCY RADIO BEACON SIGNALING

Filed Oct. 2, 1943

FIG. IA

INVENTORS.
STANLEY N. VAN VOORHIS.
JOHN S. KIRBY-SMITH.
JAMES B. HORNER KUPER.

BY

ATTORNEY

Patented July 29, 1952

2,605,394

UNITED STATES PATENT OFFICE 2,605,394

HIGH-FREQUENCY RADIO BEACON SIGNALING

Stanley N. Van Voorhis, Rochester, N. Y., John S. Kirby-Smith, Cambridge, Mass., and James B. Horner Kuper, Redding, Conn., assignors, by mesne assignments, to the United States of America as represented by the Secretary of the Navy Application October 2, 1943, Serial No. 504,784

10 Claims. (Cl. 250—6)

This invention relates to radio beacons and more specifically to radio beacons for operation at ultra-high frequencies.

In a radio-echo detection system operating in the microwave region, say, for example, at a wave length of ten centimeters, the tuning of the selective receiver used for detecting the reflected electromagnetic energy is very critical. Assume, for example, that the frequency of the transmitted radio waves is 3,000 megacycles, corresponding to a wave length of ten centimeters, and the receiver is responsive to a frequency range of 2 megacycles. The wave length of received electromagnetic energy corresponding to this receiver sensitivity range would then be 10.00333 and 9.99667 centimeters. From an examination of these very narrow wave length limits it is evident that if some form of beacon or identification transmitter whose output of electromagnetic energy could be detected by a radio-echo detection system should be desired, it would be necessary to have the beacon frequency very accurately controlled and almost identical to the operating frequency of the echo detection system. Likewise, radio-echo detection systems required to utilize information obtained from this beacon would necessarily have to be frequency-stabilized also.

Assuming it to be possible to maintain the frequency of the transmitted electromagnetic energy from the radio-echo detection systems within these narrow limits, which is in fact difficult in the present state of the art, this would greatly increase the possibility of interference between these various systems. It is highly desirable in cases where several such echo detection systems are to be operating in the same area, to space the frequencies at which they operate in order to prevent interference between the various installations. Thus, it would be necessary to provide a fixed-frequency beacon for every frequency being used by the various echo detection devices. This disadvantage is easily overcome by the present invention, which allows a single radio beacon to be used with radio detection systems operating at relatively great frequency differences.

In the generation of electromagnetic oscillations of very short wave length, such as in the centimeter region, the high value of Q which may be obtained by the use of cavity resonators has resulted in the development of various types of oscillators employing these resonators for determining the operating frequency. The resonant frequency of such cavities depends, with other factors, on the volume of the resonant cavity, and a range of tuning may be obtained for such oscillators by varying the volume of the resonant cavity either by squeezing or compressing the cavity or by the insertion of metallic plungers in the cavity to reduce its effective volume.

This invention in its preferred form makes use of a radio beacon transmitter employing an ultrahigh-frequency oscillator of the resonant cavity type whose frequency may be varied over rather wide ranges by both electrical and mechanical means. A system such as is about to be described in more detail may be made light and compact, thereby lending itself to portable operation. If the beacon is located at some fixed point, it may serve as a marker for vessels carrying radio-echo detection systems, or may be used to provide a means for identifying boats or the like as friend or foe. It possesses the further advantage in that a single beacon unit may operate satisfactorily with radio-echo detection systems operating over a range of, say, 100 megacycles.

It is one of the objects of the invention, therefore, to provide a radio beacon which may be operated in conjunction with various radio-echo detection apparatus operating at different frequencies.

Another object of this invention is to provide a radio beacon which is capable of producing a distinctive indication as in the form of a succession of dots or lines, on the indicator of an echo-detection apparatus.

It is a further object of this invention to provide a radio beacon apparatus which is simple and compact in form as well as reliable in performance, so that it may be installed on small craft and operated without special attention.

Further objects of the invention will become clear as the description proceeds.

Figure 1:
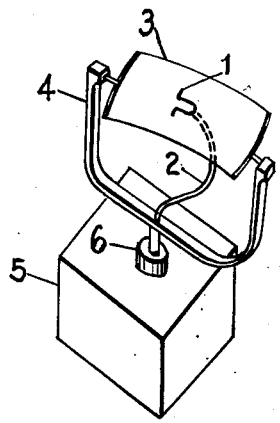

Referring now to the annexed drawings, Fig. 1 is a simplified perspective view of one possible form of the invention.

Fig. 1A is a block diagram showing a beacon transmitter and a suitable remote receiver.

Figure 2:
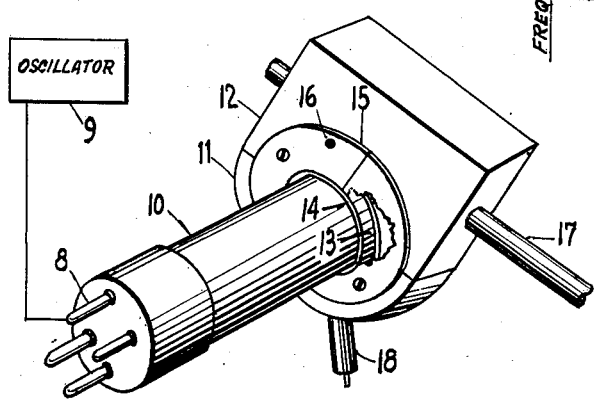
Figure 3:
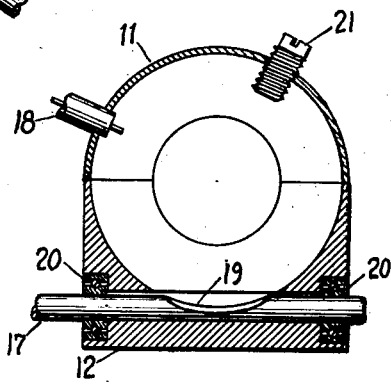

In Fig. 2 is shown a form of ultra-high-frequency oscillator tube and its associated cavity resonator preferred for use in the apparatus of this invention, a cross-sectional view of this resonator being shown in Fig. 3.

Fig. 4 is a plot of the frequency variation of the high-frequency oscillator.

Referring now to Fig. 1, the radiating element 1 is shown which is connected to a radio-frequency transmission line 2. Located behind the element 1 is a reflector 3 supported by the movable yoke 4. The entire antenna assembly is supported by the bearing 6, which may also include a suitable rotating connection means for the radio-frequency feed line 2. The supporting base 5 may be so arranged that the complete high-frequency oscillator and its associated parts are contained therein. If it be desired, a suitable driving motor and a mechanism may also be included in 5 to cause the yoke 4 to rotate, thus providing a complete coverage in azimuth by the radiation from the antenna assembly. The desired elevation angle of the beam of electromagnetic energy may be obtained by tilting the antenna and its reflector in the vertical plane.

The reflector 3 has been shown as a portion of a parabolic reflector which gives a greater concentration of the electro-magnetic energy in the horizontal than in the vertical plane, but may be any reflector suitable for concentrating the electro-magnetic energy being radiated from the element 1. It is also possible to omit reflector 3 and to use a non-directional radiating means, thus eliminating the necessity of rotating the antenna assembly to obtain coverage at all positions in azimuth.

A non-directional antenna has a further advantage which results from the fact that radio-echo detection systems generally employ revolving directive antennas, so that if the radio beacon also employed such a revolving antenna, the beacon might not be picked up by the radio-echo detection system if both antennas revolved at the same speeds. A similar result might occur if the respective antenna speeds of revolution had an integral multiple relationship.

The ultra-high frequency oscillator tube which we prefer to use for the generation of the electromagnetic energy is of the velocity-modulation type, having a cavity resonator which is at least in part external to the tube, and having a suitable control electrode by which the oscillator frequency may be varied electrically, as by varying the voltage of the control electrode with respect to the other electrode of the tube. Such an oscillator tube and its external cavity resonator is shown in Fig. 2 where the oscillator tube 10 has an external cavity resonator formed by two parts 11 and 12. The cavity resonator formed by the two parts 11 and 12 is effectively a short cylindrical section surrounding the vacuum tube 10. The metal flange 13, which is fastened by means of copper-to-glass seal 14 to the internal portion of the tube 10 and the outside glass envelope of this tube, provides electrical contact between the external resonator and the internal portion of the oscillator. Though it is not shown, a second metal flange identical to 13 serves as a contact on the other side of the resonator. The cavity is held in place around the tube 10 by means of the split ring 15 fastened to the parts 11 and 12 by the screws 16, this ring 15 pressing the metal flange 13 against 11 and 12 to insure good electrical contact.

Extending through portion 12 of the resonant cavity is the circular rod 17 which has been grooved as indicated at 19, Fig. 3. As the rod 17 revolves the volume of the resonator cavity changes with the rod position, thereby causing a variation in the output frequency of the oscillator. The rod 17 may be supported by means of the bearings 20. The screw 21 shown projecting through the cavity wall is to provide additional tuning means, so that the mid-frequency of the variations caused by the rotation of the rod 70 may be fixed. The output of the cavity resonator is obtained by means of the concentric line and coupling loop indicated at 18.

If the shaft 17 is rotated by means of a motor or other suitable device, the output frequency of the oscillator will vary in a manner which is determined by the shape of the groove 19. By a suitable choice of the shape of the groove 19 the oscillator frequency may be made to vary roughly in a sinusoidal manner, whereby the output frequency will have a specific instantaneous value twice during each revolution of the rod 17, except for the frequencies at the extreme limits of the frequency variation. The frequency deviation on one side of the mid-frequency caused by the rotation of the rod 17 is indicated as $f_1$ in Fig. 4. This plot of the sinusoidal frequency variation in Fig. 4 has superposed upon it a higher frequency variation which is caused by a voltage applied to the frequency-control electrode by means of the terminal 8 from a local oscillator 9. Of course, other types of frequency variation with the rod rotation may be used, as for example, a saw tooth.

If the rotation of the rod 17 causes a total frequency variation of 300 megacycles about a mean value of 3,000 megacycles, or 10 centimeters wave length, the output of the oscillator will vary from a wave length of 9.50 to 10.50 centimeters. If the rod 17 is rotated at a speed of 30 revolutions per second, and the variation in output frequency is approximately sinusoidal, the output frequency will alternate between these limits of wave length 60 times per second. Referring to Fig. 1A any echo detection system represented as 25 operating within the effective range of the electromagnetic energy being radiated from the beacon transmitter and sensitive to electromagnetic wave energy of these wave length limits will receive energy each time the beacon frequency is substantially the same as that at which the echo detection system is operating. Thus, due to the frequency discrimination of the radio-echo detection receiver, the detected signals resulting from the operation of the beacon appear in the receiver as intermittent pulses.

The indicator 26 of the receiver, which may be a cathode ray tube, will then show dots or broken lines according to the length of the pulses and the rate of sweep used in the indicator tube. Because such indications will generally be out of synchronism with the sweep circuits of the indicator, they will have a characteristic random or shifting appearance which will serve to distinguish them from ordinary radio-echo signals. It is usually desirable to produce the indications resulting from beacon operation in the form of short broken lines. Consequently, in the case of radio-echo systems indicating range, where one sweep rate is of the order of 20 to several hundred microseconds, the pulses produced by the operation of the beacon should preferably last less than 0.1 millisecond. If the receiver bandwidth is about 2 megacycles and the dimension $f_2$ (Fig. 4) is about 10 megacycles, the frequency of the high-frequency wave should therefore be greater than 2 kilocycles. Particularly convenient and desirable frequencies for these waves are in the range of 30 to 50 kilocycles. In general the frequency should be small with regard to the carrier frequency, preferably less than 0.1% thereof, when the carrier frequency is in the microwave range.

The rate of rotation of the rod 17 is not critical, but in general it is desirable to make it substantially slower than the pulse-repetition rate of the radio-echo detection systems with which the beacon is likely to be used. In general speeds between 3 and 30 revolutions per second are convenient.

With the grooved rod 17 rotating at 30 revolutions per second the maximum number of effective pulses per second received by the echo detection system is 60. The effective pulse rate from the beacon transmitter may be increased by superposing a rapid frequency variation on the frequency change caused by the rotation of this rod 17. For the case of the preferred form of the velocity modulation tube shown, the frequency control electrode is capable of producing a frequency variation of several megacycles as the voltage applied to the contact 8 is varied. If the range of these frequency variations, indicated as $f_2$ in Fig. 4, is say, for example, 10 megacycles and the pass band of the selective receiver 25 is 2 megacycles, whenever the rotation of the rod 17 brings the beacon oscillator frequency within the portion of the frequency spectrum to which the echo detection system is responsive, these higher frequency variations sweeping through the passband of the receiver produce a series of output pulses in the receiver. In this manner the pulse repetition rate during the period the detection system is responsive to the beacon is the repetition rate of these 10 megacycle frequency variations. These frequency changes are shown greatly enlarged in Fig. 4 for the sake of clarity, and also are indicated as having a much lower repetition rate than is preferred.

A typical repetition rate which might be used for these higher frequency variations is 30 kilocycles per second, but it has been found that this repetition rate may range from 2 kilocycles to several hundred kilocycles. Any convenient wave form may be used, as, for instance, a sinusoid or saw tooth. Any voltage wave form may be used which will produce the desired result of sweeping the oscillator frequency rapidly through its limits of variation.

While we have shown a specific form of the invention in the foregoing specification, we do not wish to limit ourselves in the scope of our invention except as is indicated in the appended claims.

What we desire to claim and obtain by Letters Patent is:

1. A radio transmitter for beacon service including a generator of high-frequency oscillations having an oscillator vacuum tube having a voltage-sensitive frequency-controlling electrode and an adjustable frequency-controlling resonator, said electrode and resonator having substantially independent effects, means for periodically varying the voltage of said electrode at a frequency much less than that of said generated oscillations and means for periodically varying the tuning of said resonator at a frequency much less than that of the said variation of the voltage of said electrode and over a range substantially greater than the range of frequency variation resulting from the said variation of the voltage of said electrode.

2. A radio transmitter for beacon service including a generator of high-frequency oscillations having an oscillator vacuum tube having a voltage sensitive frequency-controlling electrode and a frequency-controlling resonator, means for periodically varying the voltage of said electrode at a frequency much less than that of said generated oscillations and thereby producing a periodic variation of the frequency of said oscillations, means for periodically varying the tuning of said resonator at a rate much less than that of the aforesaid periodic variation and thereby varying the average frequency about which the aforesaid periodic variation of frequency occurs, said last mentioned means being adapted to produce a variation of frequency over a range large compared to the range of variation of frequency resulting from variation of the voltage of said electrode.

3. A radio transmitter in accordance with claim 2 in which the means for varying the voltage of the frequency-controlling electrode is adapted to operate at a frequency in excess of 2,000 cycles per second and less than 0.1% of the frequency of the transmitted oscillations and in which the means for varying the tuning of the resonator is adapted to operate at a frequency less than 300 cycles per second.

4. A radio transmitter in accordance with claim 2 in which the means for periodically varying the tuning of the resonator includes a rotatable shaft adapted when rotated to vary the volume of said resonator and means for rotating said shaft.

5. A radio beacon transmitter including a velocity modulation type electron tube generator of high frequency oscillations, said velocity modulation tube having an electrode adapted to control oscillation frequency as a function of the voltage applied thereto and having a frequency controlling cavity resonator, a source of oscillations of a frequency much less than said high frequency oscillations of said velocity modulated tube, said source being connected to said frequency controlling electrode, thereby varying said high frequency oscillations at the frequency of said source, rotatable mechanical tuning means extending into said cavity resonator for varying the resonant frequency thereof, means for rotating said mechanical means at a speed providing a periodic frequency variation of said high frequency oscillations at a rate much less than that produced by said source, said last mentioned means being adapted to produce a variation of frequency over a range large compared to the range of frequency variation resulting from the connection of said oscillation source to said frequency controlling electrode.

6. Radio beacon apparatus for providing a characteristic indication of the relative location thereof to a craft equipped with pulse detection apparatus including a selective radio receiver and a cathode ray tube indicator, said apparatus comprising, means for generating and transmitting an ultra-high frequency radio signal, means for periodically varying the frequency of said transmitted signal over a range greater than the bandwidth of said receiver to produce a series of pulses in said receiver when the frequency of said transmitted signal is varied in the frequency range to which said receiver is tuned, and means operative simultaneously with the aforementioned frequency varying means for periodically varying the frequency of said transmitted signal at a different rate.

7. Radio beacon apparatus for providing a characteristic indication of the relative location thereof to any or all of a plurality of craft each equipped with pulse detection apparatus including a selective radio receiver and a cathode ray tube indicator, each selective receiver being tuned to a different frequency within a predetermined frequency band, said beacon apparatus comprising means for generating and transmitting an ultra-high frequency radio signal and means for varying the frequency of said transmitted signal in a substantially periodic manner over a frequency range greater than said predetermined band and greater than the bandwidth of each aforesaid receiver, and means for simultaneously varying the frequency of said transmitted signal at a rate greater than said first mentioned frequency varying means and over a frequency range greater than the bandwidth of said receiver.

8. In apparatus for indicating the presence of a structure to a craft equipped with a pulse detection system including a selective radio receiver and a cathode ray indicator, a radio transmitter of a continuous ultra-high frequency radio wave comprising, a generator of high frequency oscillations including an oscillator electron tube having a voltage sensitive frequency controlling electrode and an adjustable frequency controlling cavity resonator, means for periodically varying the voltage of said electrode to produce a periodic variation in the frequency of said generator over a range greater than the bandwidth of said receiver and at a rate sufficiently rapid to produce a series of pulses in said receiver of the order of 0.1 millisecond or less as the frequency of said transmitter is varied in the neighborhood of the frequency to which said receiver is tuned, and means for concurrently varying the tuning of said resonator to produce a variation in frequency of said generator at a slower rate over a relatively wide range to cover the frequencies at which receivers of different crafts may be tuned at a sufficiently slow rate to permit several pulses to be received by each receiver as the transmitter frequency is varied cross the bandwidth to which the receiver is responsive.

9. Radio beacon apparatus for providing a characteristic indication of the relative location thereof to a craft equipped with pulse detection apparatus including a selective radio receiver comprising, means for generating and transmitting an ultra-high frequency continuous wave radio signal, means for concurrently periodically varying the frequency of said transmitted signal at two differing rates over a range greater than the bandwidth of said receiver to produce a series of pulses in said receiver when the frequency of the transmitted signal is varied in the frequency range to which said receiver is tuned.

10. Radio beacon apparatus for providing a characteristic indication of the relative location thereof to any or all of a plurality of craft, each equipped with pulse detection apparatus including a selective radio receiver and an indicator, each selective receiver being tuned to a different frequency within a predetermined frequency band, said beacon apparatus comprising, means for generating and transmitting an ultra-high frequency radio signal and means for concurrently varying the frequency of said transmitted signal in a substantially periodic manner at a first period over a frequency range greater than said predetermined band and at a second period over a frequency range greater than the bandwidth of each aforesaid receiver.

S. N. VAN VOORHIS.
JOHN S. KIRBY-SMITH.
J. B. HORNER KUPER.

REFERENCES CITED

The following references are of record in the file of this patent:

UNITED STATES PATENTS

| Number | Name | Date |
| --- | --- | --- |
| Re. 22,990 | Hansen et al. | Mar. 23, 1948 |
| 2,104,011 | Armstrong | Jan. 4, 1938 |
| 2,206,896 | Higgins et al. | July 9, 1940 |
| 2,218,223 | Usselman et al. | Oct. 15, 1940 |
| 2,261,879 | Higgins | Nov. 4, 1941 |
| 2,306,282 | Samuel | Dec. 22, 1942 |
| 2,337,214 | Tunick | Dec. 21, 1943 |
| 2,352,254 | Curtis | June 27, 1944 |
| 2,387,685 | Sanders | Oct. 23, 1945 |
| 2,414,785 | Harrison et al. | Jan. 21, 1947 |
| 2,416,336 | Marchand | Feb. 25, 1947 |
| 2,418,139 | Preisman | Apr. 1, 1947 |
| 2,439,387 | Hansen et al. | Apr. 13, 1948 |
| 2,457,137 | Earp et al. | Dec. 28, 1948 |
| 2,465,341 | Altovsky | Mar. 29, 1949 |